Nov. 24, 1931.　　　F. E. REED　　　1,833,262
PIPE CONNECTION JOINT
Filed June 24, 1930　　2 Sheets-Sheet 1
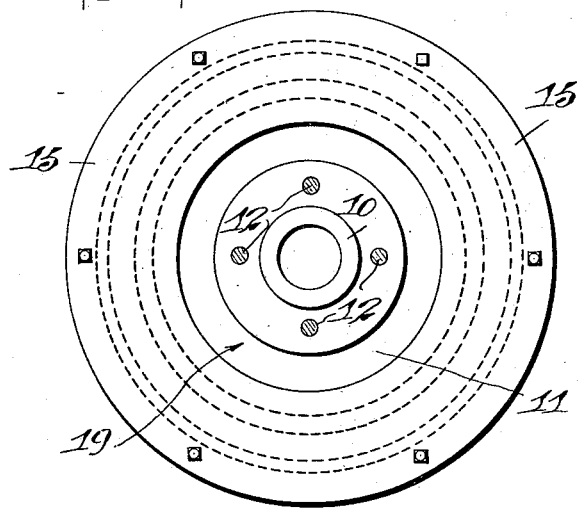
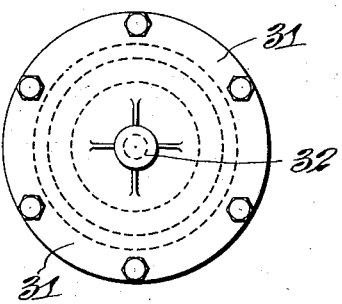
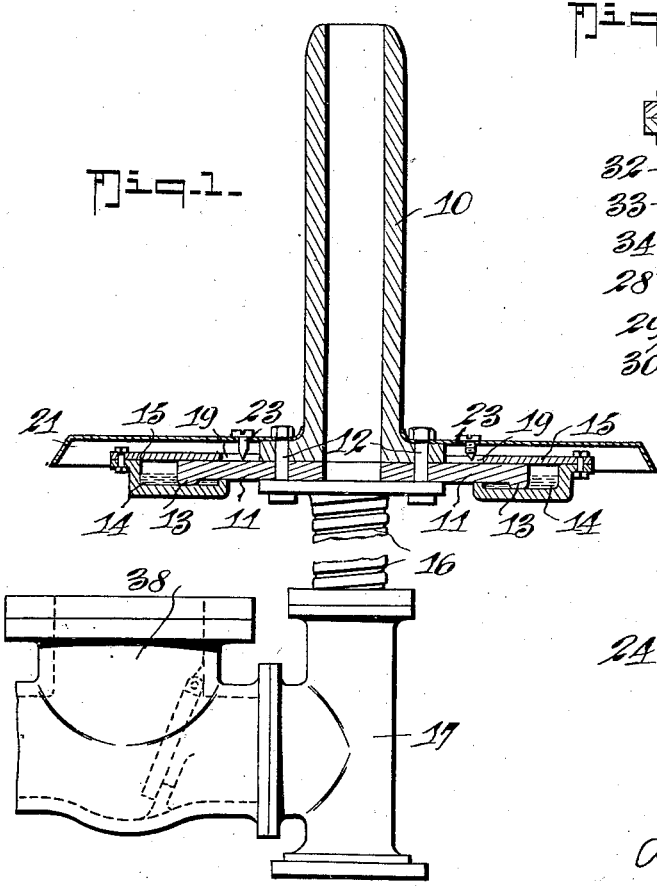
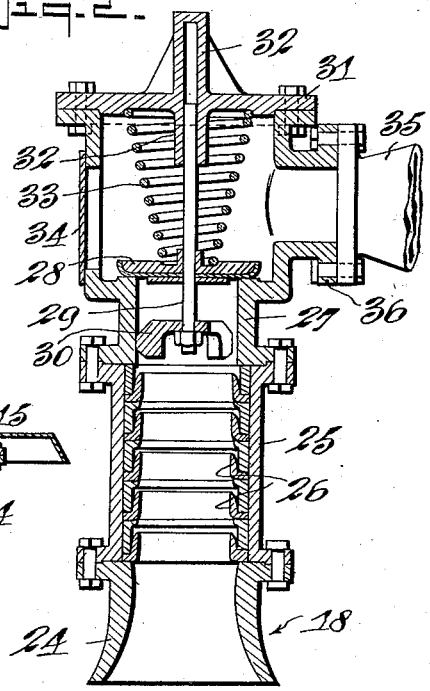
INVENTOR
F. Edgar Reed.
BY
ATTORNEY

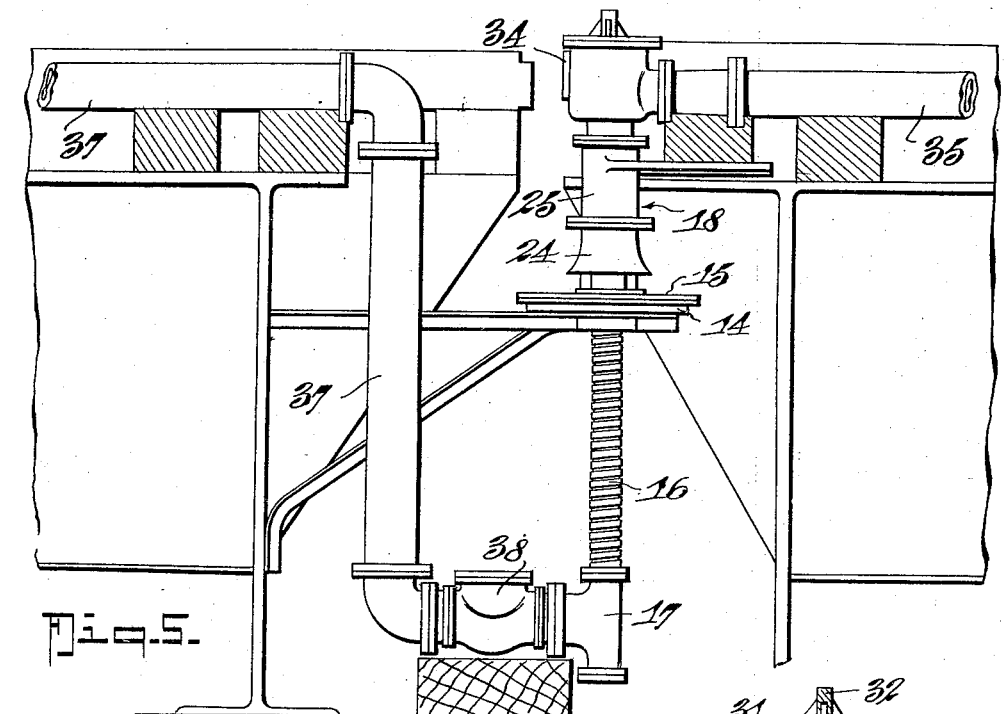
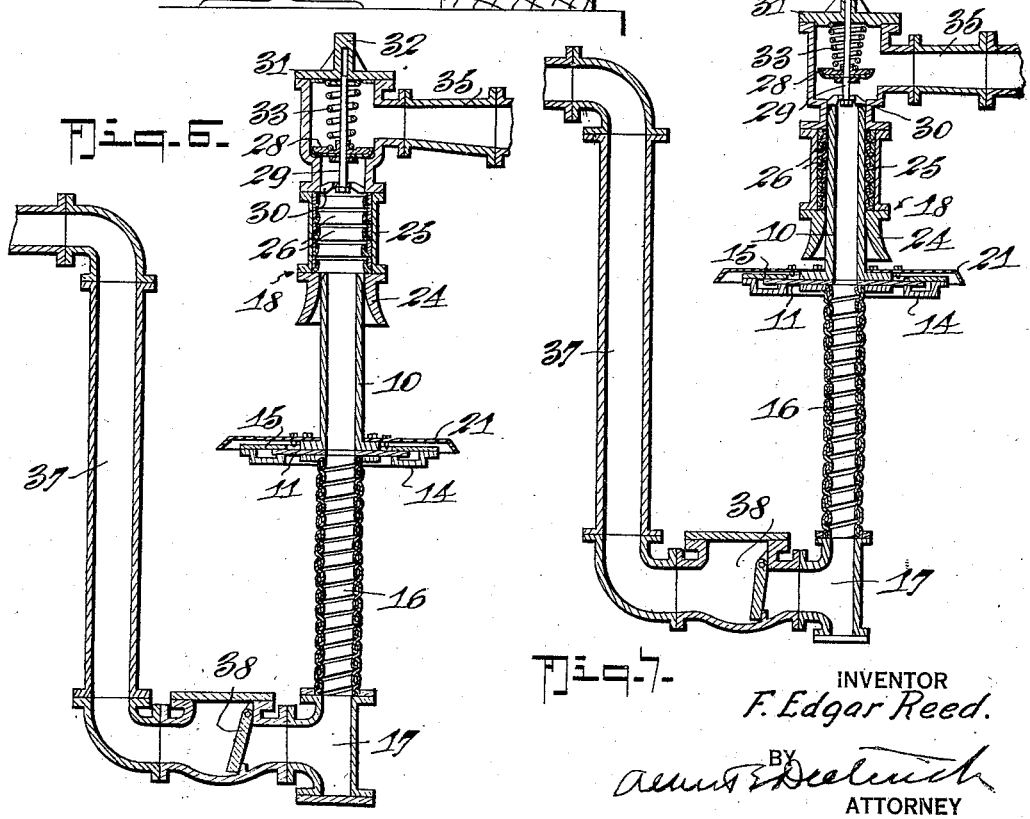

Patented Nov. 24, 1931

1,833,262

UNITED STATES PATENT OFFICE

FERDINAND EDGAR REED, OF VANCOUVER, BRITISH COLUMBIA, CANADA

PIPE CONNECTION JOINT

Application filed June 24, 1930. Serial No. 463,482.

This invention relates to pipe joints of that class adapted to be automatically connected and disconnected at will.

An object of the invention has been to provide in simple form a strong, serviceable and tight joint suitable for the conveyance of fluids and requiring no manual attention other than an occasional inspection to assure the proper functioning of the device.

Another object of the invention is to provide a pipe joint that will automatically cut off the source of fluid supply and prevent the escape thereof when the joint is broken.

Another object of the invention is to provide a pipe joint that will automatically open the main supply when the joint is made and connected.

Another object of the invention is to provide a joint of this class wherein all expansion and contraction is taken care of, thus assuring perfect alignment of the members when connecting.

The invention is particularly adapted for use on bascule and swing bridges and such like structures carrying water and gas mains and conduits, and in which it is necessary to shut off the supply before the bridge can be opened.

The invention is designed as an improvement on my Canadian Patent No. 289,942, granted May 28, 1929 and several important features not found in my previous invention are incorporated herein.

The important features of the invention are the means of disconnecting the pipe-line by the opening movement of the bridge and automatically shutting off the fluid supply, the means provided to prevent the escape of the fluid in that portion of the line disconnected from the main line, and the re-establishing of pressure-tight connection in the pipe line by the closing of the bridge and automatic turning on of the fluid supply.

The invention consists essentially of a male and female member in a pipe line adapted to be broken or disconnected, such as would occur when installed upon a bridge with a bascule lift or swing span, one part of which is fixed and stationary and the other part movable, and so arranged that the connecting and disconnecting of the pipe line is automatically effected without manual attention.

The male member is provided with means for flexible movement that permits of ready alignment with the female member and overcomes any tendency to stick or bind therewith, also providing expansion and contraction of the pipe line by this means.

This means consists of providing the male member with a large flange base, the outer edges of which are reinforced and carried in a shallow annular trough in which there is oil. This trough is provided with a cover to keep out dirt and prevent the escape of the lubricant and allow movement of the flange base therein.

Below the base flange is a flexible connection to the stationary pipe-line. The two main parts of the joint are so arranged that one of them slides within the other, and resilient packing rings are provided to make a pressure-tight joint. These packing rings may be fitted to either member.

The male member upon entry into the female member contacts and raises off its seat a valve which shuts off the fluid supply when seated. Thus the entry of the male member establishes a flow of fluid in the pipe-line, and the withdrawing of the male member shuts it off.

The invention is particularly described in the following specification, reference being made to the drawings by which it is accompanied, in which:

Figure 1 is a sectional elevation of the male member showing the flexible connection to the conduit below and the base support permitting movement of the member.

Figure 2 is a sectional elevation of the female member showing the spring valve and the multiplicity of packing rings.

Figure 3, a plan view of the base support of male member.

Figure 4 is a plan view of the top of check valve cover of Figure 2.

Figure 5 is an illustration of an installation upon a bascule lift span.

Figure 6 is a longitudinal section showing the parts about to be coupled together.

Figure 7 is a similar view showing the parts in the coupled position.

In these drawings the numeral 10 indicates the male member of the apparatus secured to the circular supporting base 11 by the bolts 12. The base member 11 has formed on the lower side a circumferential rib 13 giving support to the outer edges.

The base 11 is supported in an annular trough 14 containing lubricant that permits free movement in a horizontal plane of the male member. The trough 14 is fitted with the annular cover 15 and provides a recess 19 at the top of the base flange 11 in which oil may be placed, and this effectively lubricates the free movement of the base flange under the annular cover 15.

Connected to the lower side of the base flange 11 is the flexible pipe 16 connected to the flanged elbow 17 of the pipe-line 37. Adjacent the elbow 17 is a standard check valve 38 interposed between the flanged elbow 17 and the end of the pipe-line 37. The check valve 38 is shown in the drawings.

A top cover 21 tightly fitting around the lower end of the male member 10 and secured by the through bolts 12 is provided to further keep out dirt and moisture from the lubricated joints below. The cover 21 is provided with plug holes 23 for insertion of lubricant in the recess 19.

The female member 18, as shown in the drawings, is preferably made in three parts, but can be made in one, if desired, and consists of the bell-mounted entrance 24, the packing cylinder 25 fitted with the packing rings 26 and surmounted by the valve cage 27 in which is fitted the valve 28 carried on the stem 29 to the lower end of which is fitted contact member 30. The valve cage 27 is provided with the top cover plate 31 having the valve stem guide 32 in which the valve stem slides when the valve is opened.

The valve 28 is provided with a reseating spring 33 suitably secured around the valve stem guide 32.

The inspection cover plate 34 is also provided. The valve cage 27 is bolted to the main supply line 35 by the flanges 36.

The female member 18 is in the main supply line 35 and forms the terminus to same when disconnected from the member 10 in the line 37. The withdrawal of the male member 10 out of the female member 18 permits the valve 28 to close upon its seat and shut off from its source the flow of fluid in the pipe-line 35. The check valve 38 in the line 37 prevents the escape of the fluid in that pipe-line.

In an installation upon a bridge with bascule span on which the pipe-line is laid a flexible connection is provided at the hinge portion of the bridge and the pipe line continued across the lifting space, terminating with the female member 18. This in turn connects with the male member 10 mounted below the deck of the bridge.

The male member 10 forms the end of a U-loop in the continuing pipe line and in the bottom of the U is fitted the check valve 38 to prevent leakage in that portion of the pipe disconnected from the source of supply.

Having now fully described my invention, what I claim and desire to be protected in by Letters Patent, is:

1. In a pipe joint of the class described the combination comprising a substantially T-shaped member, a bell-mouthed apertured member secured to one end of said T, a closure member to the aperture in the opposite end of said T member, a valve seat intermediate of said bell-mouth and said closure member, a check valve engaging said seat, a helical spring adapted to close said valve, a spigot member having a flexible connection to a pipe line, a flange member intermediate of said spigot member and said flexible connection, an annular trough and cover, said flange member adapted to have movement within said annular trough, said spigot member adapted to engage said bell-mouthed aperture, a plurality of resilient packing rings secured within said bell-mouthed apertured member adapted to secure a pressure-tight joint when said spigot member is inserted in said bell-mouthed aperture.

2. In apparatus of the character described, a fixed pipe line and a displaceable pipe line, and a detachable male and female connection between said pipe lines; said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member.

3. In apparatus of the character described, a fixed pipe line and a displaceable pipe line, and a detachable male and female connection between said pipe lines; said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member, said end-supporting means comprising a fixed cupped ring, a flanged plate carried by said flexible pipe and having its flange located in said ring, a retaining cover ring secured to said cupped ring and overlying said plate for holding said flanged plate with its flange in said cupped ring.

4. In apparatus of the character described, a fixed pipe line and a displaceable pipe line, and a detachable male and female connection between said pipe lines: said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member, said end-supporting means comprising a fixed cupped ring, a flanged plate carried by said flexible pipe and having its flange located in said ring, a retaining cover ring secured to said cupped ring and overlying said plate for holding said flanged plate with its flange in said cupped ring, there being a space between said cover ring and said male member for the reception of lubricant, said cupped ring also serving as a lubricant reservoir.

5. In apparatus of the character described, a fixed pipe line and a displaceable pipe line, and a detachable male and female connection between said pipe lines; said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member, said end-supporting means comprising a fixed cupped ring, a flanged plate carried by said flexible pipe and having its flange located in said ring, a retaining cover ring secured to said cupped ring and overlying said plate for holding said flanged plate with its flange in said cupped ring, there being a space between said cover ring and said male member for the reception of lubricant, said cupped ring also serving as a lubricant reservoir, and a guard plate carried by said male member and having a skirt to protect said cupped ring and flanged plate.

6. In apparatus of the character described, a fixed pipe line and a displaceable pipe line, and a detachable male and female connection between said pipe lines; said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member, said end-supporting means comprising a fixed cupped ring, a flanged plate carried by said flexible pipe and having its flange located in said ring, a retaining cover ring secured to said cupped ring and overlying said plate for holding said flanged plate with its flange in said cupped ring, there being a space between said cover ring and said male member for the reception of lubricant, said cupped ring also serving as a lubricant reservoir, and a guard plate carried by said male member and having a skirt to protect said cupped ring and flanged plate, said guard plate having at least one lubricant passing plugged aperture above said lubricant receiving space.

7. In apparatus of the character described, a fixed pipe line and displaceable pipe line, and a detachable male and female connection between said pipe lines; said connection including a relatively rigid female member and a shut-off valve in the displaceable pipe line adjacent the female member, a flexible pipe section connected to the fixed pipe line at one end and a male member connected to the other end of said flexible pipe line and adapted to be received within the female member when the male and female members are brought together, said male and female members being relatively separable along the general direction of their axes, a back check valve in said fixed pipe line, and means to support the end of said flexible pipe section which has the male member for limited transverse movement thereof to accommodate said male member to said female member, said male member upon insertion into said female member serving to open said shut-off valve, and spring means to close said shut-off valve when the male member is separated from the female member, and packing means cooperating with said male and female connection to render the same liquid-tight when assembled.

In testimony whereof I affix my signature.

F. EDGAR REED.